US012654493B2

(12) United States Patent
Yoshizumi et al.

(10) Patent No.: US 12,654,493 B2
(45) Date of Patent: Jun. 16, 2026

(54) TIRE

(71) Applicant: SUMITOMO RUBBER INDUSTRIES, LTD., Kobe (JP)

(72) Inventors: Takuma Yoshizumi, Kobe (JP); Naoya Sofue, Kobe (JP); Daichi Aoki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/276,821

(22) PCT Filed: Feb. 2, 2022

(86) PCT No.: PCT/JP2022/004014
§ 371 (c)(1),
(2) Date: Aug. 10, 2023

(87) PCT Pub. No.: WO2022/181269
PCT Pub. Date: Sep. 1, 2022

(65) Prior Publication Data
US 2024/0123765 A1 Apr. 18, 2024

(30) Foreign Application Priority Data
Feb. 25, 2021 (JP) ................................ 2021-028557

(51) Int. Cl.
*B60C 5/14* (2006.01)
*B60C 1/00* (2006.01)
(Continued)

(52) U.S. Cl.
CPC .............. *B60C 5/14* (2013.01); *B60C 1/0008* (2013.01); *B60C 19/00* (2013.01); *B60C 23/0493* (2013.01); *B60C 2019/004* (2013.01)

(58) Field of Classification Search
None
See application file for complete search history.

(56) References Cited

U.S. PATENT DOCUMENTS 6,030,478 A 2/2000 Koch et al.
6,885,291 B1 * 4/2005 Pollack ............... B60C 23/0493 340/447
(Continued)

FOREIGN PATENT DOCUMENTS

EP 2 223 814 A1 9/2010
EP 2 873 540 B1 9/2020
(Continued)

OTHER PUBLICATIONS

English machine translation of WO 2016001225 (Year: 2016).*
(Continued)

*Primary Examiner* — Robert C Dye
(74) *Attorney, Agent, or Firm* — Birch, Stewart, Kolasch & Birch, LLP

(57) ABSTRACT

Provided is a tire in which cracks do not occur in the tire inner member during high-speed running and the occurrence of tire air leakage and detachment of electronic component mounting members is suppressed. A tire in which an electronic component mounting member for a built-in electronic component is mounted on the surface of a tire inner member, wherein the electronic component mounting member has an electronic component storage portion for storing an electronic component and a joint portion equipped with a joint surface for mounting the electronic component mounting member on the surface of the tire inner member, and the acetone extraction weight $AE_r$ (mass %) of the electronic component mounting member and the acetone extraction weight $AE_i$ (mass %) of the tire inner member satisfy (formula 1).

$$AE_r / AE_i > 1 \quad \text{(formula 1)}$$

14 Claims, 3 Drawing Sheets

(51) Int. Cl.
*B60C 19/00* (2006.01)
*B60C 23/04* (2006.01)

(56) References Cited

U.S. PATENT DOCUMENTS

| | | | | |
|---|---|---|---|---|
| 2008/0035259 | A1* | 2/2008 | Mancosu | B60C 23/0493 156/60 |
| 2009/0015415 | A1 | 1/2009 | Uehara et al. | |
| 2010/0212791 | A1* | 8/2010 | Incavo | B60C 23/0493 235/487 |
| 2010/0276563 | A1* | 11/2010 | Cubizolle | B60C 23/0493 248/633 |
| 2014/0116594 | A1* | 5/2014 | Miyazaki | B60C 1/0008 524/65 |
| 2015/0122006 | A1 | 5/2015 | Yamaguchi | |
| 2020/0055353 | A1 | 2/2020 | Nishi | |
| 2020/0070594 | A1 | 3/2020 | Usami | |
| 2022/0281269 | A1 | 9/2022 | Suita | |

FOREIGN PATENT DOCUMENTS

| | | | | |
|---|---|---|---|---|
| EP | 3711974 | A1 * | 9/2020 | B60C 1/00 |
| JP | 11-278021 | A | 10/1999 | |
| JP | 2007-24695 | A | 2/2007 | |
| JP | 2013-226853 | A | 11/2013 | |
| JP | 2016-78520 | A | 5/2016 | |
| JP | 2018-16185 | A | 2/2018 | |
| JP | 2018-154306 | A | 10/2018 | |
| JP | 2018-199396 | A | 12/2018 | |
| JP | 2019-23594 | A | 2/2019 | |
| JP | 2019-26218 | A | 2/2019 | |
| JP | 6756021 | B1 | 9/2020 | |
| WO | WO 2007/010755 | A1 | 1/2007 | |
| WO | WO 2007/100111 | A1 | 9/2007 | |
| WO | WO-2016001225 | A1 * | 1/2016 | B60C 1/0008 |
| WO | WO-2016162345 | A1 * | 10/2016 | B60C 11/0304 |
| WO | WO-2019186069 | A1 * | 10/2019 | B29D 30/0061 |

OTHER PUBLICATIONS

Naprex 38 Datasheet, Jun. 2023, ExxonMobil, [retrieved on Sep. 26, 2024]. Retrieved from the Internet: <URL: https://www.mobil.com/en-cl/industrial/pds/as-xx-naprex-38> (Year: 2023).*
English machine translation of WO2016162345A1. (Year: 2016).*
English machine translation of WO2019186069A1. (Year: 2019).*
International Search Report (PCT/ISA/210) issued in PCT/JP2022/004014, dated Apr. 5, 2022.
Written Opinion of the International Searching Authority (PCT/ISA/237) issued in PCT/JP2022/004014, dated Apr. 5, 2022.

* cited by examiner

[Fig. 1]
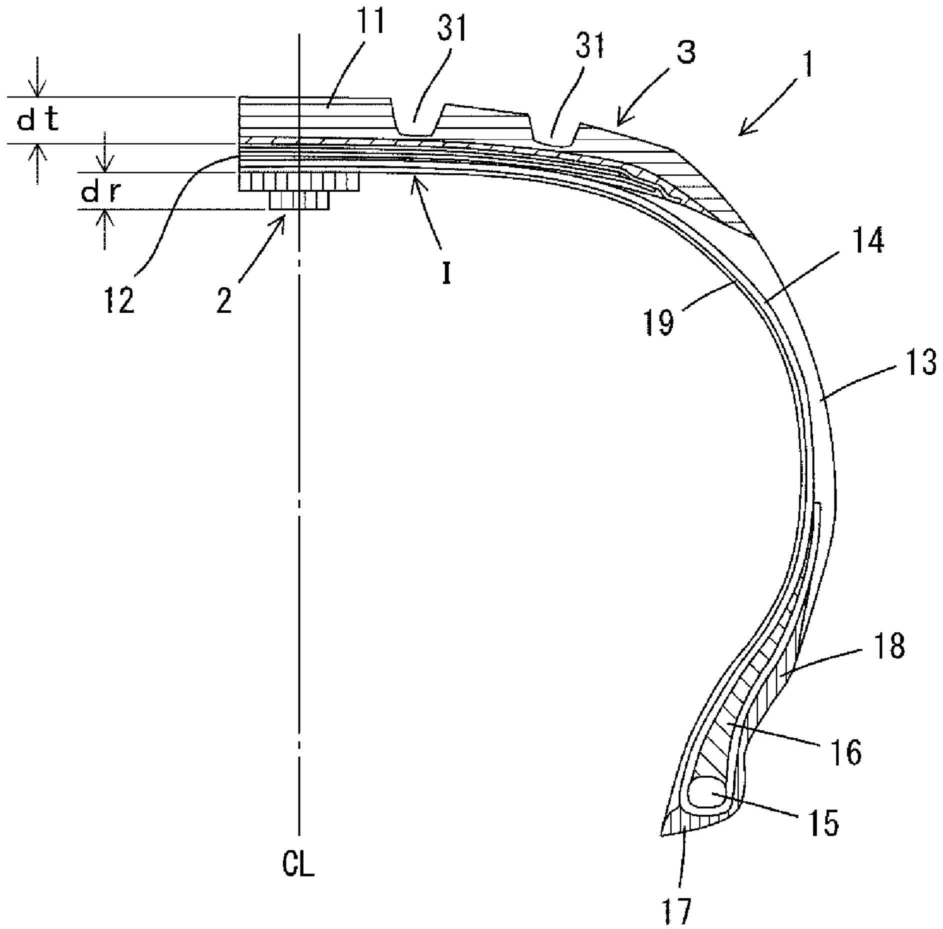

[Figure 2]
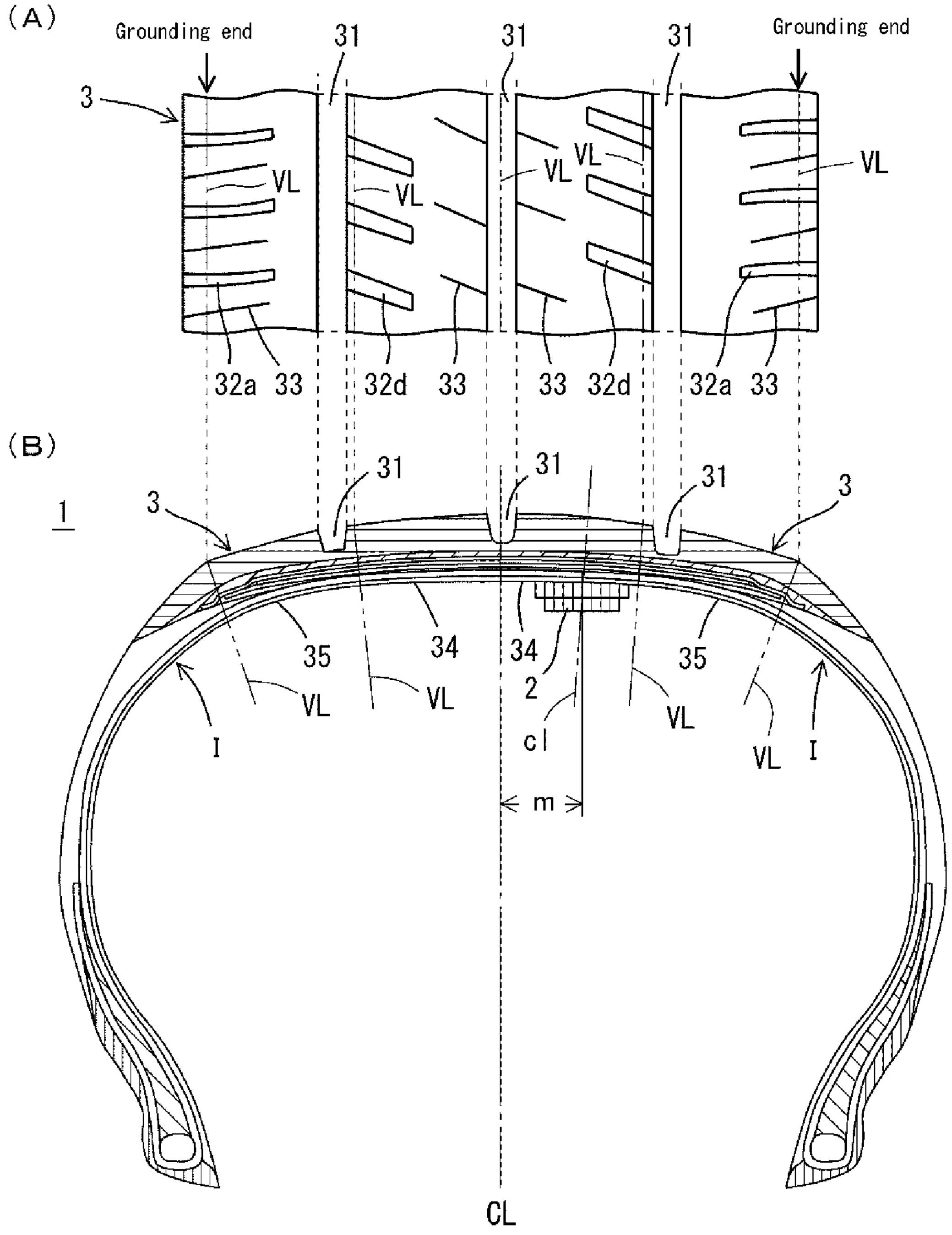

[Figure 3]
(A)
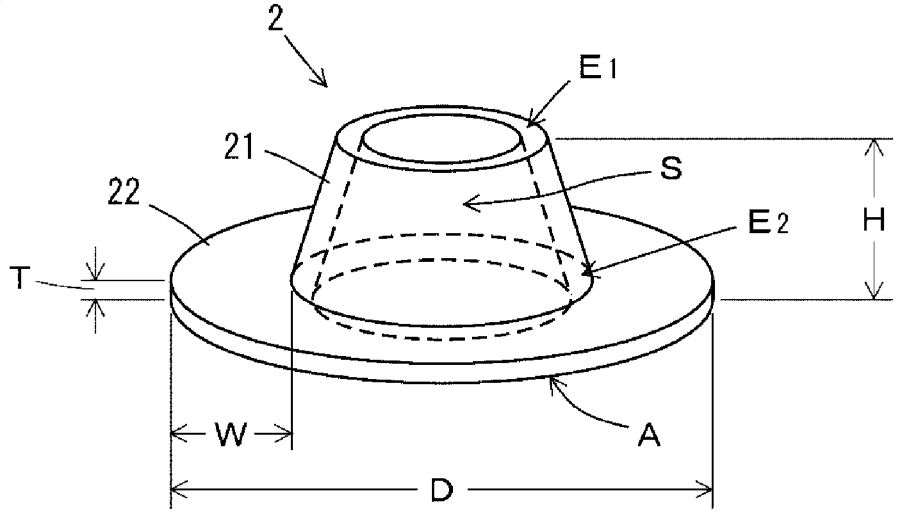
(B)
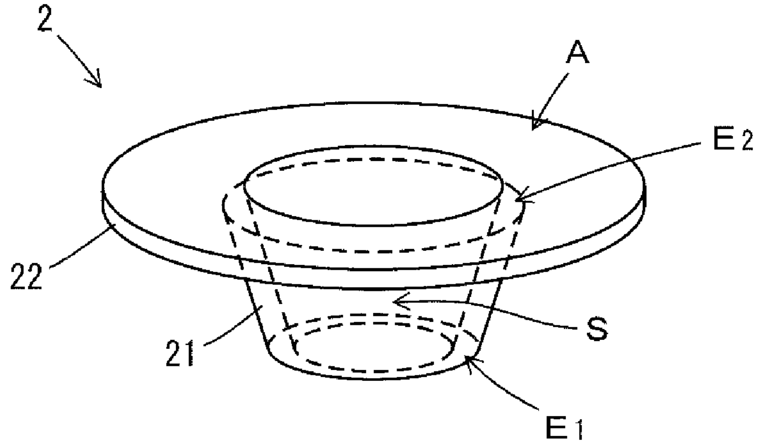
[Figure 4]
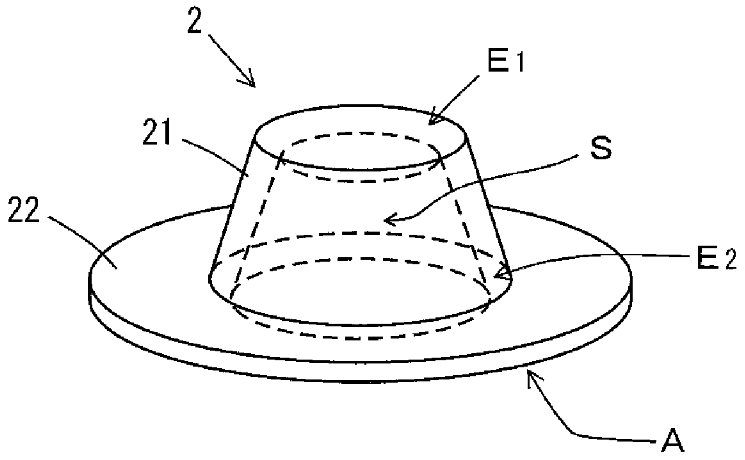

TIRE

TECHNICAL FIELD

The present disclosure relates to a tire in which an electronic component mounting member containing an electronic component is provided on the surface of a tire inner member arranged in a tire bore.

BACKGROUND ART

In order to run a vehicle comfortably, it is considered important to properly manage the air pressure of the installed tires, and in recent years, it is becoming common to install a tire pressure monitoring system (TPMS) inside the tire. (for example, Patent Documents 1 to 4).

PRIOR ART DOCUMENTS

Patent Documents

[Patent Document 1] JP 2018-016185 A
[Patent Document 2] JP2018-199396 A
[Patent Document 3] JP2019-023594 A
[Patent Document 4] JP2019-026218 A

SUMMARY OF INVENTION

Problem to be Solved by the Invention

A sensor such as a TPMS is generally an electronic component made of metal, so if it is directly attached to a rubber tire and run at high speeds, cracks may occur in the tire inner member during running, resulting in occurrence of air leakage from the tire, peeling of the electronic component mounting member, and the like. Hence, further improvement is required.

Therefore, an object of the present disclosure is to provide a tire in which cracks do not occur in the tire inner member during high-speed running, and air leakage from the tire and peeling of an electronic component mounting member are suppressed.

Means for Solving the Problem

The present discloser has conducted intensive studies on how to solve the above problems, found that the above problems can be solved by the disclosure described below, and completed the present disclosure.

This disclosure is a tire in which an electronic component mounting member for incorporating an electronic component is mounted on the surface of the tire inner member, wherein the electronic component mounting member has an electronic component storage portion that stores the electronic component, and a joint portion that has a joint surface for mounting the electronic component mounting member to the surface of the tire inner member, and the acetone extraction amount $AE_r$ (% by mass) of the electronic component mounting member and the acetone extraction amount $AE_i$ (% by mass) of the tire inner member satisfy the following (formula 1).

$$AE_r / AE_i > 1 \quad \text{(formula 1)}$$

Effect of the Invention

According to the present disclosure, it is possible to provide a tire in which cracks do not occur in the tire inner member during high-speed running, and air leakage from the tire and peeling of an electronic component mounting member are suppressed.

BRIEF DESCRIPTION OF THE DRAWING

FIG. 1 is a cross-sectional view showing the configuration of a tire according to an embodiment of the present disclosure.

FIG. 2(A) is a diagram showing the shape of a tread surface of a tire according to another embodiment of the present disclosure, and (B) is a cross-sectional view showing a configuration of the tire according to another embodiment of the present disclosure.

FIG. 3(A) is a perspective view of an electronic component mounting member according to an embodiment of the present disclosure as viewed from the side facing a joint surface, and (B) is a perspective view as viewed from the joint surface side.

FIG. 4 is a perspective view of an electronic component mounting member according to another embodiment of the present disclosure as viewed from the side facing the joint surface.

EMBODIMENTS FOR CARRYING OUT THE INVENTION

[1] Features of the Tire According to the Present Disclosure

First, the features of the tire according to the present disclosure will be explained.

1. Overview

A tire according to the present disclosure is a tire in which an electronic component mounting member for incorporating an electronic component is mounted on the surface of the tire inner member arranged in a tire bore. The electronic component mounting member has an electronic component storage portion that stores the electronic component, and a joint portion that has a joint surface for mounting the electronic component mounting member to the surface of the tire inner member. In addition, the acetone extraction amount $AE_r$ (% by mass) of the electronic component mounting member and the acetone extraction amount $AE_i$ (% by mass) of the tire inner member satisfy the following (formula 1).

$$AE_r / AE_i > 1 \quad \text{(formula 1)}$$

By using the tire as described above, as will be described later, occurrence of cracks in the tire inner member is suppressed even during high-speed running, resulting in air leakage from the tire, peeling of electronic component mounting members, and the like during running can be suppressed.

In the above description, the acetone extraction amount AE amount is the ratio (% by mass) of the amount (mass) reduced by extraction, obtained by measuring the acetone extraction amount in accordance with JIS K 6229 for each test piece cut out from each of the electronic component mounting member and the tire inner member.

More specifically, each vulcanized rubber test piece is immersed in acetone at room temperature under normal pressure for 72 hours to extract soluble components, and the mass of each test piece before and after extraction are measured, and it can be obtained by the following formula.

$$\text{Acetone extraction amount (\%)} = \{\text{mass of rubber test piece before extraction} - \text{mass of rubber test piece after extraction}\} / (\text{mass of rubber test piece before extraction})\} \times 100$$

2. Mechanism of Effect Manifestation in Tires According to the Present Disclosure The mechanism of effect manifestation in the tire according to the present disclosure is considered as follows.

As described above, in the tire according to the present disclosure, the electronic component mounting member is mounted on the surface of the tire inner member arranged in the tire bore. However, a tire inner member such as an inner liner is usually added with a softening agent component such as oil. Since this softening agent component escapes from the tire inner member over time, the tire inner member hardens over time and loses its flexibility.

If a member with a different hardness, such as an electronic component mounting member, is mounted to the hardened portion in this way, a large stress is applied to the joint portion due to the effect of the mutual rigidity difference, so it invites the occurrence of cracks, during high-speed running, air leakage from the tire, and peeling off of the electronic component mounting member.

Therefore, in the present disclosure, the acetone extraction amount $AE_r$ (% by mass) of the electronic component mounting member and the acetone extraction amount $AE_i$ (% by mass) of the tire inner member satisfy $AE_r/AE_i>1$ (formula 1).

That is, since the acetone extraction amount AE can be considered as an index indicating the content of softening agent components that easily migrate, the above $AE_r/AE_i>1$ (formula 1) indicates content of the softener component in the electronic component mounting member is larger than content of the softener component in the tire inner component. $AE_r/AE_i$ is preferably greater than 1.1, more preferably greater than 1.2, and further preferably greater than 1.3. On the other hand, it is preferably less than 1.65, more preferably less than 1.60, further preferably less than 1.55, and further preferably 1.51 or less.

In this way, by making the content of the softening agent component of the electronic component mounting member larger than the content of the softening component of the tire inner member, the softening agent component of the electronic component mounting member migrates to the tire inner member. It is considered that hardening with time is suppressed, and crack generation during high-speed running is suppressed. As a result, it is conceivable that the occurrence of air leakage from the tire, peeling-off of the electronic component mounting member, and the like during high-speed running can be suppressed.

The above-described acetone extraction amount can be measured in accordance with JIS K 6229:2015 (extraction time: 10 hours).

The acetone extraction amount $AE_r$ of the electronic component mounting member is preferably less than 12% by mass, more preferably less than 11.5% by mass, further preferably 11.3% by mass or less, and further preferably 11% by mass. On the other hand, it is preferably more than 6.5% by mass, more preferably more than 7% by mass, further preferably more than 7.5% by mass, and further preferably 8.9% by mass or more.

The acetone extraction amount $AE_r$ of the tire inner member is preferably less than 13% by mass, more preferably 12.2% by mass or less, further preferably less than 12% by mass, further preferably 11.9% by mass or less, and further preferably less than 11% by mass. On the other hand, it is preferably more than 6.5% by mass, more preferably more than 7% by mass, further preferably 7.5% by mass or more, further preferably more than 7.5% by mass, and further preferably 8.5% by mass or more.

3. Preferable Embodiments of the Tire According to the Present Disclosure.

Moreover, the tire according to the present disclosure preferably adopts the following embodiments.

(1) Adhesion Area Between the Joint Portion of the Electronic Component Mounting Member and the Tire Inner Member In the tire according to the present disclosure, the adhesion area between the joint portion of the electronic component mounting member and the tire inner member is preferably 12 $cm^2$ or more.

Since the migration of the softening agent component described above is performed at the bonding portion between the joint portion of the electronic component mounting member and the tire inner member, the larger adhesion area is preferable. Specifically, it is possible to migrate enough of the softening agent component to sufficiently suppress the occurrence of crack, if the adhesion area is 12 $cm^2$ or more. The adhesion area is more preferably 13 $cm^2$ or more, further preferably 14 $cm^2$ or more, and further preferably 28.26 $cm^2$ or more. On the other hand, it is preferably less than 75 $cm^2$, more preferably less than 70 $cm^2$, and further preferably less than 65 $cm^2$.

(2) Complex Elastic Modulus of Electronic Component Mounting Member and Tire Inner Member In the present disclosure, it is preferable that complex elastic modulus $E^*_r$ (MPa) of the joint portion at 70° C. and the complex elastic modulus $E^*_i$ (MPa) of the tire inner member at 70° C. satisfy $0.5E^*_i \leq E^*_r \leq 3.0E^*_i$ (formula 2). The complex elastic modulus $E^*_r$ (MPa) and the complex elastic modulus $E^*_i$ (MPa) are measured under the conditions of a temperature of 70° C., an initial strain of 10%, a dynamic strain of ±1%, a frequency of 10 Hz, and a deformation mode of elongation.

The complex elastic modulus E* is a parameter related to rigidity, and by controlling the complex elastic modulus $E^*_r$ of the electronic component mounting member and the complex elastic modulus $E^*_i$ of the tire inner member to satisfy $0.5E^*_i \leq E^*_r \leq 3.0E^*_i$ (formula 2), the difference in rigidity between them is suppressed from increasing more than necessary, so the stress applied to the joint portion is suppressed and the occurrence of cracks is suppressed. More preferably, $1.0E^*_i \leq E^*_r \leq 2.95E^*_i$, and further preferably $1.5E^*_i \leq E^*_r \leq 2.9E^*_i$.

In the above description, $E^*_r$ and $E^*_i$ are measured according to the provisions of JIS K 6394 using a viscoelasticity measuring device such as "Eplexor (registered trademark)" manufactured by GABO.

(3) Loss Tangent of Tire Inner Member

In the present disclosure, the loss tangent (70° C. tan $\delta_i$) of the tire inner member at 70° C. is preferably 0.18 or less. Loss tangent (70° C. tan $\delta_i$) is measured under the conditions of measurement temperature: 70° C., initial strain: 10%, dynamic strain: ±1%, frequency: 10 Hz, deformation mode: tensile.

The loss tangent (tan δ) can be expressed as loss elastic modulus (E")/storage elastic modulus (E') (tan δ=E"/E'), and a smaller tan δ means a less viscous component.

By reducing the viscous component in the tire inner member to satisfy 70° C. tan $\delta_i \leq 0.18$, together with the concentration gradient of the softener component between the electronic component mounting member and the tire inner member, the softening agent component easily migrates from the electronic component mounting member. As a result, hardening of the tire inner member is more sufficiently suppressed, and the occurrence of cracks can be suppressed. The 70° C. tan $\delta_i$ is more preferably 0.17 or less, further preferably 0.15 or less, further preferably 0.14 or less, and further preferably 0.13 or less. Although the lower limit is not limited, for example, it is preferably 0.01 or more, more preferably 0.05 or more, and further preferably 0.1 or more.

In the above description, tan $\delta_i$ can be measured, for example, using a viscoelasticity measuring device such as "Eplexor (registered trademark)" manufactured by GABO, similarly to the measurement of E*.

[2] Specific Embodiment

Next, specific embodiments of the present disclosure will be described. In the following description, as the examples, a rubber electronic component mounting member is used as the electronic component mounting member, and an inner liner is used as the tire inner member. However, as long as (formula 1) is satisfied, they are not particularly limited, and instead, a plastic electronic component mounting member, or a tire inner member other than an inner liner may be used.

1. Tire Configuration

FIG. 1 is a cross-sectional view showing the configuration of a tire according to this embodiment. In FIG. 1, 1 is a tire, 2 is an electronic component mounting member, 11 is the tread, 12 is the belt, 13 is the sidewall, 14 is the carcass layer, 15 is the bead core, 16 is the bead apex, 17 is the chafer, 18 is the clinch, 19 is the tire inner member (inner liner), and 31 is the circumferential groove. Further, I is the tire bore surface, and CL is the center line in the width direction of the tire.

As shown in FIG. 1, the electronic component mounting member 2 is first placed on the tire bore surface I, i.e., the surface of the inner liner 19. At this time, in order to soften the impact applied to the electronic component mounting member, a line passing through the center point of the contact surface of the electronic component mounting member with the tire bore surface and perpendicular to the surface profile of the tread portion is arranged so as not to pass through the circumferential groove 31 formed on the surface 3 of the tread portion.

Here, the surface profile of the tread portion is the surface shape formed by connecting land surfaces forming the contact surface of the tread portion of a tire installed to the "standardized rim", applied with "standardized internal pressure", and put in an unloaded state. For example, it can be confirmed by fixing the bead portion of a section cut out with a width of about 2 cm in the radial direction of the tire according to the applicable rim width and connecting the adjacent land parts virtually.

In addition, in order to obtain monitoring information with high accuracy and stability, the electronic component mounting member is arranged preferably so that, in the tire cross section, the center of the electronic component mounting member is located in the central two regions closest to the tire equatorial plane among the four regions separated by a line extending parallel to the tire radial direction from the line that divides the two tread edges forming the tread contact width into four equal parts. As an example, FIG. 1 shows an example in which the electronic component mounting member 2 is mounted on the central portion in the tire width direction of the bore surface of the tire, that is, on the center line CL. Although not shown, electronic components are incorporated in the electronic component mounting member 2. Here, since the amount of deformation is particularly large on the center line CL of the tire, it is preferable that the center line CL and the center of the electronic component mounting member are deviated, and the deviation width is preferably 1 to 50 mm in the tire axial direction.

FIG. 2 is a drawing of a tire according to another embodiment of the present disclosure, where (A) is a diagram showing the shape of the surface of the tread, and (B) is a cross-sectional view showing the configuration of the tire. In FIG. 2(A), VLs are both grounding ends forming the tread grounding width and virtual lines dividing both grounding ends into four equal parts. In FIG. 2B, cl is the center line of the electronic component mounting member 2, and m is the deviation of the center of the electronic component mounting member from the tire center line CL. Areas 34 and 35 are the areas divided into four equal parts by the virtual line VL, 34 is the area closest to the tire equatorial plane, and 35 is the outside area in the axial direction of the tire. In FIG. 2(A), **32*d* is a central lateral groove, and 32*a* is a lateral groove provided with a decorative groove at the outer end in the axial direction of the tire. Moreover, 33** is a sipe.

In the tire of this embodiment, one circumferential groove 31 is formed on the center line CL of the tire on the surface 3 of the tread portion, that is, on the equator, and one circumferential groove 31 is formed on each side thereof. In the tire in which the circumferential groove 31 is formed on the equator in this way, it is preferable to locate the center of the electronic component mounting member within the center 2 regions 34 closest to the tire equatorial plane among four regions separated by virtual lines VL that extend parallel to the tire radial direction from the lines that divide both ground contact edges and the distance between the ground contact edges into four equal parts, specifically, among four regions separated by virtual lines VL extending perpendicular to a profile from the position on the profile of the tire surface that divides both ground contact edges into four equal parts.

Here, "both ground contact edges forming the tread contact width" refers the edges that form the maximum linear distance in the axial direction of the contact surface with a flat plate when the tire is installed on a "standardized rim", "standardized internal pressure" is applied and a "standardized load" is applied after being placed stationary on the flat plate in a vertical position. Specifically, for example, it can be specified by applying a "standardized load" to the tire with ink on the tread surface, pressing it against a cardboard, and transferring it.

Further, whether or not the electronic component mounting member is located in the central two areas closest to the tire equatorial plane, among the four regions divided by equally dividing the region between both ground contact edges into four regions, can be confirmed, for example, by transcribing the ground contact edge position on the cross section of the section cut out to a width of about 2 cm and dividing the tire into four equal portions along the surface profile.

Regarding the grooves formed on the surface of the tread portion, it can be known from the tread profile obtained by the radius formed on the tread surface of the tire that is installed on the "standardized rim" with "standardized internal pressure" added and placed in an unloaded state. Specifically, for example, the measurement can be easily performed by fixing the bead portion of a section cut out in the tire radial direction with a width of about 2 cm according to the applicable rim width.

The "standardized rim" described above is a rim defined for each tire in the standard system including the standard on which the tire is based. For example, in the case of JATMA (Japan Automobile Tire Association), it is the standard rim in applicable sizes described in the "JATMA YEAR BOOK", in the case of "ETRTO (The European Tire and Rim Technical Organization)", it is "Measuring Rim" described in "STANDARDS MANUAL", and in the case of TRA (The Tire and Rim Association, Inc.), it is "Design Rim" described in "YEAR BOOK". In the case of tires that are not specified in the standard, it refers a rim that can be assembled and can maintain internal pressure, that is, the rim that does not cause air leakage from between the rim and the tire, and has the smallest rim diameter, and then the narrowest rim width.

The "standardized internal pressure" is the air pressure specified for each tire by the above-mentioned standards, and is the maximum air pressure for JATMA, the maximum value described in the table "TIRE LOAD LIMITS AT VARIOUS COLD INFLATION PRESSURES" for TRA, and "INFLATION PRESSURE" for ETRTO.

In addition, the "standardized load" is the load defined for each tire by the standards described above and refers to the maximum mass that can be loaded on the tire, and is the maximum load capacity for JATMA, the maximum value described in "TIRE LOAD LIMITS AT VARIOUS COLD INFLATION PRESSURES" for TRA, and "LOAD CAPACITY" for ETRTO.

Next, the electronic component mounting member 2 has an electronic component storage portion for storing electronic components, and a joint portion having a joint surface for mounting the electronic component mounting member 2 on the surface of the inner liner 19.

FIG. 3(A) is a perspective view of the electronic component mounting member 2 in the present embodiment as viewed from the side open, and FIG. 3(B) is a perspective view as viewed from the joint surface side. Moreover, FIG. 4 is a perspective view of the electronic component mounting member 2 in another embodiment, viewed from the side facing the joint surface.

In FIGS. 3 and 4, 21 is an electronic component storage portion, 22 is a joint, A is the joint surface to be joined to the inner liner 19, $E_1$ is the upper end portion of the electronic component storage portion 21 facing the joint surface, $E_2$ is the lower end portion of the electronic component housing portion on the joint surface side, and S is a storage space for electronic components. In FIG. 3A, D is the diameter (outer diameter) of the joint surface, T is the thickness of the joint portion, W is the width of the flange, and H is the thickness (height) of the electronic component mounting member.

As shown in FIGS. 3 and 4, the electronic component storage portion 21 is formed in a cylindrical shape and has a storage space S for electronic components inside. A flange-shaped joint portion 22 is formed at the lower end portion $E_2$ of the electronic component storage portion 21, and a joint surface A is formed on the lower surface of the joint portion 22. By forming the joint portion 22 into a flange shape, the size of the joint surface A can be increased and a sufficient adhesion area can be secured with the tire inner member, so that the joint strength can be further increased.

The cross-sectional shape, size and depth of the storage space S are appropriately determined according to the shape and size of the electronic components to be stored. As for the shape of the cross section, for example, in addition to the illustrated circular shape, an elliptical shape, a polygonal shape, or the like can be appropriately set. The side wall of the cylinder is not perpendicular to the joint portion 22, and it is preferable to be formed in a truncated cone shape so that the size of the cross section of the storage space S is larger on the lower end $E_2$ side and smaller on the upper end $E_1$ side.

It is preferable the lower end $E_2$ side of the electronic component storage portion 21 is formed to be open. As a result, for example, the sensor can be brought into direct contact with the inner tire member of the tire, and accurate information can be obtained with higher sensitivity. On the other hand, the upper end portion $E_1$ side is preferably open as shown in FIG. 3(A). As a result, the electronic components can be detachably mounted and can be easily replaced. As shown in FIG. 4, the upper end $E_1$ side may be closed. In this case, the electronic components can be hermetically stored in the storage space S, and placed in a stable environment.

The diameter (outer diameter) D of the joint surface A is preferably 20 mm or more, more preferably 25 mm or more, and further preferably 30 mm or more. On the other hand, it is preferably 60 mm or less, more preferably 55 mm or less, and further preferably 50 mm or less.

The thickness (height) H of the electronic component mounting member is preferably 10 mm or more, more preferably 15 mm or more, and further preferably 20 mm or more. On the other hand, it is preferably 40 mm or less, more preferably 35 mm or less, and further preferably 30 mm or less.

The thickness T of the joint portion is preferably 0.5 mm or more, more preferably 0.6 mm or more, and further preferably 0.8 mm or more. On the other hand, it is preferably 1.4 mm or less, more preferably 1.3 mm or less, and further preferably 1.2 mm or less.

The width W of the flange is preferably 4 mm or more, more preferably 6 mm or more, and further preferably 8 mm or more. On the other hand, it is preferably 16 mm or less, more preferably 14 mm or less, and further preferably 12 mm or less.

The combined weight of the electronic component and the electronic component mounting member is preferably 50 g or less, more preferably 40 g or less, and further preferably 30 g or less.

2. Tire Inner Member (Inner Liner)

Next, an inner liner will be explained as a specific example of the tire inner member, but as described above, the tire inner member is not limited to the inner liner.

(1) Rubber Composition Constituting Tire Inner Member (Inner Liner)

In the present embodiment, the tire inner member (inner liner) is formed using, for example, a rubber composition (inner liner rubber composition) in which each compounding material shown below is compounded.

(a) Rubber Component

Examples of the rubber component of the rubber composition for inner liners include diene-based rubbers such as isoprene-based rubber, butadiene rubber (BR), styrene butadiene rubber (SBR), styrene isoprene butadiene rubber (SIBR), chloroprene rubber (CR), and acrylonitrile butadiene rubber (NBR); and butyl-based rubbers. A rubber component may be used independently or two or more types may be used together. Among the above rubbers, it is preferable to contain butyl-based rubber as a main rubber component because of its excellent air barrier properties and heat resistance.

(a-1) Butyl-Based Rubber

As the butyl-based rubber, those commonly used in the tire industry can be suitably used. Specifically, in addition to ordinary butyl rubber (IIR), halogenated butyl rubbers (X-IIR) such as brominated butyl rubber (Br-IIR), chlorinated butyl rubber (Ci-IIR), fluorinated butyl rubber (F-IIR), and brominated isobutylene-p-methylstyrene copolymer (Exxpro 3035 manufactured by Exxon Mobil Chemical). Among these, Br-IIR is preferably used because it facilitates sulfur cross-linking even when it does not contain natural rubber.

In addition, as the butyl-based rubber, a recycled butyl-based rubber can also be used in combination. Recycled butyl-based rubber usually has a high content of non-halogenated butyl rubber (regular butyl rubber), so it can be used in combination with halogenated butyl rubber to ensure good air barrier properties and vulcanization speed. Particularly, when a mixture of a fatty acid metal salt and a fatty acid amide is added to a compound containing regenerated butyl rubber, the performance balance between sheet processability and air barrier property is synergistically significantly improved. Therefore, it is preferable.

Recycled butyl-based rubber refers to pulverized rubber products containing a large amount of butyl-based rubber, such as tire tubes and bladders used in the manufacture of tires, or the butyl-based rubber content contained in the pulverized product that is heated and pressurized. The recycled butyl-based rubber includes those that can be re-vulcanized by cutting the cross-linking of the rubber component (desulfurization treatment). Generally, about 50% by weight of the pulverized material is recycled butyl-based rubber. Although sulfur is also contained in the recycled butyl-based rubber, it is deactivated to the extent that it does not contribute to cross-linking.

Commercially available recycled butyl-based rubber includes a tube recycled rubber manufactured by Muraoka Rubber Co., Ltd., which is manufactured by heat-treating a butyl tube under pressure; bladder recycled rubber manufactured by Carquest Co., Ltd., which is produced by pulverizing bladders with an extruder; and the like. These recycled butyl-based rubbers may be used alone or in combination of two or more.

The content of the butyl-based rubber in 100 parts by mass of the rubber component is preferably 70 parts by mass or more, more preferably 75 parts by mass or more, and further preferably 80 parts by mass or more for the reason of excellent air barrier properties. The upper limit is not particularly limited, and it may be 100 parts by mass, but from the viewpoint of sheet processability, it is preferably 95 parts by mass or less, and more preferably 90 parts by mass or less.

Here, the content of the recycled butyl-based rubber in 100 parts by mass of the rubber component is preferably 5 parts by mass or more, and more preferably 8 parts by mass or more, from the viewpoint of the merit of using the recycled butyl-based rubber. On the other hand, it is preferably 25 parts by mass or less, and more preferably 30 parts by mass or less, from the viewpoint of ensuring sufficient air barrier properties and vulcanization speed.

The content of the recycled butyl-based rubber is preferably 7 parts by mass or more, and more preferably 10 parts by mass or more, in 100 parts by mass of the total butyl-based rubber. On the other hand, it is preferably 35 parts by mass or less, and more preferably 30 parts by mass or less.

(a-2) Isoprene Rubber

The rubber component preferably contains an isoprene-based rubber, as needed, from the viewpoint of improving sheet processability and air barrier properties in a well-balanced manner.

Examples of isoprene-based rubber include isoprene rubber (IR), natural rubber (NR), and reformed natural rubber. NR also includes deproteinized natural rubber (DPNR), and high-purity natural rubber (UPNR). Reformed natural rubber includes epoxidized natural rubber (ENR), hydrogenated natural rubber (HNR), grafted natural rubber, and the like. As NR, for example, SIR20, RSS #3, TSR20, and the like, which are commonly used in the tire industry can be used. Among them, NR and IR are preferable because they can improve sheet processability and air barrier property in a well-balanced manner.

The content of the isoprene-based rubber in 100 parts by mass of the rubber component is preferably 5 parts by mass or more, and more preferably 10 parts by mass or more, in consideration of the balance between sheet processability and air barrier properties. On the other hand, it is preferably 30 parts by mass or less, and more preferably 25 parts by mass or less.

(a-3) Other Rubber

In addition to butyl-based rubber and isoprene-based rubber, as needed, a rubber commonly used in the tire industry, such as a diene-based rubber which includes butadiene rubber (BR), styrene butadiene rubber (SBR), ethylene propylene diene rubber (EPDM), styrene isoprene butadiene rubber (SIBR), chloroprene rubber (CR), acrylonitrile butadiene rubber (NBR), and the like can be used. These may be used alone or in combination of two or more.

(b) Compounding Materials Other than Rubber Components (b-1) Compatibilizer

A compatibilizer is contained for the purpose of reducing the separation energy at the interface between the polymer and the filler or between different polymers and assisting mutual mixing. The compatibilizer is not particularly limited, and those conventionally used in the rubber industry can be used. Specific examples of compatibilizers include non-reactive compatibilizers such as styrene-ethylene-butadiene block copolymers, styrene-methyl methacrylate block copolymers, ethylene-styrene graft copolymers, chlorinated polyethylenes, aromatic hydrocarbon resins, aliphatic hydrocarbon resin based mixtures, and unsaturated fatty acid metallic soaps; and reactive compatibilizers such as maleic anhydride grafted polypropylene, styrene-maleic anhydride copolymers, ethylene-glycidyl methacrylate copolymers, and ethylene-glycidyl methacrylate copolymers styrene graft copolymers. The compatibilizer may be used individually by 1 type, and may be used in combination of 2 or more types.

Content of the compatibilizer is not particularly limited, but considering the air barrier property, for example, it is preferably 5 parts by mass or more, and more preferably 8 parts by mass or more, with respect to 100 parts by mass of the rubber component. On the other hand, it is preferably 15 parts by mass or less, and more preferably 12 parts by mass or less.

(b-2) Softener Component

From the viewpoint of sheet processability, the rubber composition for the inner liner preferably contains oil (including extender oil), liquid rubber, or the like as a softener component. The total content of these components is preferably 3 parts by mass or more, and more preferably 4 parts by mass or more with respect to 100 parts by mass of the rubber component. On the other hand, it is preferably 9 parts by mass or less, and more preferably 6 parts by mass or less. The content of oil also includes the amount of oil contained in the rubber (oil-extended rubber).

The oil is not particularly limited as long as it is commonly used in the tire industry, and includes mineral oil (generally referred to as process oil), vegetable oil, and mixtures thereof. As the mineral oil (process oil), for example, a paraffinic process oil, an aroma-based process oil, a naphthene process oil, or the like can be used. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice oil, beni-flower oil, sesame oil, olive oil, sunflower oil, palm kernel oil, *Camellia* oil, jojoba oil, macadamia nut oil, and tung oil. These may be used alone or in combination of two or more.

When process oil is used, it is preferable to use one with a low content of aroma components. By using a material with a low content of aroma component, compatibility with butyl rubber is improved, bleeding onto the surface of the rubber sheet is suppressed, and reduction in molding tackiness can be suppressed.

Specific examples of process oil (mineral oil) include products of Idemitsu Kosan Co., Ltd., Sankyo Yuka Kogyo Co., Ltd., Japan Energy Co., Ltd., Olisoy Co., Ltd., H&R Co., Ltd., Toyokuni Seiyu Co., Ltd., Showa Shell Sekiyu Co., Ltd., and Fuji Kosan Co., Ltd.

The liquid rubber mentioned as the softener component is a polymer in a liquid state at room temperature (25° C.) and is a polymer having a monomer similar to that of solid rubber as a constituent element. Examples of the liquid rubber include farnesene-based polymers, liquid diene-based polymers, and hydrogenated compounds thereof.

The farnesene-based polymer is a polymer obtained by polymerizing farnesene, and has a structural unit based on farnesene. Farnesene includes isomers such as α-farnesene ((3E,7E)-3,7,11-trimethyl-1,3,6,10-dodecatetraene) and ß-farnesene (7,11-dimethyl-3-methylene-1, 6,10-dodecatorien).

The farnesene-based polymer may be a homopolymer of farnesene (farnesene homopolymer) or a copolymer of farnesene and a vinyl monomer (farnesene-vinyl monomer copolymer).

Examples of the liquid diene polymer include a liquid styrene-butadiene copolymer (liquid SBR), a liquid butadiene polymer (liquid BR), a liquid isoprene polymer (liquid IR), and a liquid styrene isoprene copolymer (liquid SIR).

The liquid diene polymer has a polystyrene-converted weight average molecular weight (Mw) measured by gel permeation chromatography (GPC) of, for example, more than $1.0\times10^3$ and less than $2.0\times10^5$. In the present specification, Mw of the liquid diene polymer is a polystyrene conversion value measured by gel permeation chromatography (GPC).

The content of the liquid rubber (the total content of the liquid farnesene-based polymer, the liquid diene-based polymer, etc.) is, for example, more than 1 part by mass and less than 100 parts by mass with respect to 100 parts by mass of the rubber component.

As the liquid rubber, for example, products of Kuraray Co., Ltd. and Clay Valley Co., Ltd. can be used.

(b-3) Filler

The rubber composition for inner liner preferably contains a filler. Specific examples of filler include carbon black, graphite, silica, calcium carbonate, talc, alumina, clay, aluminum hydroxide, and mica. Among these, carbon black is preferably used as a reinforcing agent, and silica may be used in combination.

(b) Carbon Black (b-3-1) Carbon Black

Content of carbon black is, for example, preferably 10 parts by mass or more, more preferably 20 parts by mass or more, and further preferably 30 parts by mass or more with respect to 100 parts by mass of the rubber component. On the other hand, it is preferably 100 parts by mass or less, more preferably 90 parts by mass or less, and further preferably 80 parts by mass or less.

Carbon black is not particularly limited, and examples thereof include furnace blacks such as SAF, ISAF, HAF, MAF, FEF, SRF, GPF, APF, FF, CF, SCF and ECF (furnace carbon black); acetylene black (acetylene carbon black); thermal black such as FT and MT (thermal carbon blacks); and channel black such as EPC, MPC and CC (channel carbon black). These may be used individually by 1 type, and may be used 2 or more types together.

Nitrogen adsorption specific surface area ($N_2SA$) of the carbon black is, from the viewpoint of sheet processability, preferably 10 $m^2/g$ or more and 70 $m^2/g$ or less, and it is more preferably 20 $m^2/g$ or more and 40 $m^2/g$ or less. Dibutyl phthalate (DBP) absorption amount of the carbon black is, for example, more than 50 ml/100 g and less than 250 ml/100 g. The nitrogen adsorption specific surface area of carbon black is measured according to ASTM D4820-93, and the DBP absorption amount is measured according to ASTM D2414-93.

Specific carbon blacks are not particularly limited, and include N550, N660, N762 and the like. Examples of commercially available products include products of Asahi Carbon Co., Ltd., Cabot Japan Co., Ltd., Tokai Carbon Co., Ltd., Mitsubishi Chemical Corporation, Lion Corporation, Shin Nikka Carbon Co., Ltd., Columbia Carbon Co., Ltd., etc. These may be used alone or in combination of two or more.

(b-3-2) Silica

The rubber composition for inner liner may contain silica as needed, and usually it is used together with a silane coupling agent. However, if silica is used, when extruding a sheet, silica that is not covered with a silane coupling agent may re-aggregate, resulting in deterioration of sheet processability. Therefore, it is preferred not to use it if possible.

When silica is used, the BET specific surface area of silica is preferably more than 140 $m^2/g$, and more preferably more than 160 $m^2/g$. On the other hand, it is preferably less than 250 $m^2/g$, and more preferably less than 220 $m^2/g$. Content of the silica with respect to 100 parts by mass of the rubber component is preferably 5 parts by mass or more, more preferably 15 parts by mass or more, and further preferably 25 parts by mass or more. On the other hand, it is preferably 50 parts by mass or less, more preferably 40 parts by mass or less, and further preferably 30 parts by mass or less. The BET specific surface area mentioned above is the value of $N_2$ SA measured by the BET method according to ASTM D3037-93.

Examples of silica include dry-process silica (anhydrous silica) and wet-process silica (hydrous silica). Among them, wet-process silica is preferable because it has a large number of silanol groups.

As silica, for example, products of Degussa Co., Ltd., Rhodia Co., Ltd., Tosoh Silica Co., Ltd., Solvay Japan Co., Ltd., Tokuyama Co., Ltd., etc. can be used.

The silane coupling agent is not particularly limited. Examples of the silane coupling agent include sulfide-based ones such as bis(3-triethoxysilylpropyptetrasulfide, bis (2-triethoxysilylethyl)tetrasulfide, bis (4-triethoxysilylbutyl)tetrasulfide, bis(3-trimethoxysilylpropyl) tetrasulfide, bis(2-trimethoxysilylethyl) tetrasulfide, bis(2-triethoxysilylethyl)trisulfide, bis(4-trimethoxysilylbutyl) trisulfide, bis(3-triethoxysilylpropypdisulfide, bis(2-triethoxysilylethyl) disulfide, bis(4-triethoxysilylbutyl)disulfide, bis(3-trimethoxysilylpropyl) disulfide, bis(2-trimethoxysilylethyDdisulfide, bis(4-trimethoxysilylbutyndisulfide, 3-trimethoxysilylpropyl-N, N-dimethylthiocarbamoyltetrasulfide, 2-triethoxysilylethyl-N, N-dimethylthiocarbamoyltetrasulfide, and 3-triethoxysilylpropylmethacrylatemonosulfide;

mercapto-based ones such as 3-mercaptopropyltrimethoxysilane, 2-mercaptoethyltriethoxysilane, and NXT and NXT-Z manufactured by Momentive;

vinyl-based ones such as vinyl triethoxysilane, and vinyl trimethoxysilane;

amino-based ones such as 3-aminopropyltriethoxysilane and 3-aminopropyltrimethoxysilane;

glycidoxy-based ones such as γ-glycidoxypropyltriethoxysilane and γ-glycidoxypropyltrimethoxysilane;

nitro-based ones such as 3-nitropropyltrimethoxysilane, and 3-nitropropyltriethoxysilane; and chloro-based ones such as 3-chloropropyltrimethoxysilane, and 3-chloropropyltriethoxysilane. These may be used alone or in combination of two or more.

Examples of silane coupling agents that can be used include products of Degussa Co., Ltd., Momentive Co., Ltd., Shinetsu Silicone Co., Ltd., Tokyo Chemical Industry Co., Ltd., Azumax Co., Ltd., Toray Dow Corning Co., Ltd., and the like.

Content of the silane coupling agent is, for example, more than 3 parts by mass and less than 25 parts by mass with respect to 100 parts by mass of silica.

((b-3-3) Other Fillers

The rubber composition for inner liner, in addition to the carbon black and silica described above, may further contain fillers commonly used in the tire industry, such as calcium carbonate, talc, alumina, clay, aluminum hydroxide, and mica. Among them, flat aluminum hydroxide is preferable because of its excellent air barrier properties and sheet processability. The content thereof is more than 0.1 part by mass and less than 200 parts by mass with respect to 100 parts by mass of rubber components.

(b-4) Anti-Aging Agent

The rubber composition for inner liner preferably contains an antioxidant. Content of the anti-aging agent is preferably, for example, 0.2 parts by mass or more, and more preferably 0.7 parts by mass or more, with respect to 100 parts by mass of the rubber component. On the other hand, it is preferably 5.0 parts by mass or less, more preferably 3.0 parts by mass or less, and further preferably 2.0 parts by mass or less.

Examples of anti-aging agents include naphthylamine-based anti-aging agents such as phenyl-α-naphthylamine; diphenylamine-based anti-aging agents such as octylated diphenylamine and 4,4'-bis (α, α'-dimethylbenzyl)diphenylamine;

p-phenylenediamine-based anti-aging agent such as N-isopropyl-N'-phenyl-p-phenylenediamine, N-(1,3-dimethylbutyl)-N'-phenyl-p-phenylenediamine, and N,N'-di-2-naphthyl-p-phenylenediamine;

quinoline-based anti-aging agent such as a polymer of 2,2,4-trimethyl-1,2-dihydroquinolin, 6-ethoxy-2,2,4-trimethyl-1,2-dihydroquinoline, 6-anilino-2,2,4-trimethyl-1,2-dihydroquinoline, and poly-2,2,4-trimethyl-1,2-dihydroquinoline;

monophenolic anti-aging agents such as 2,6-di-t-butyl-4-methylphenol, styrenated phenol; and bis, tris, polyphenolic anti-aging agents such as tetrakis-[methylene-3-(3',5'-di-t-butyl-4'-hydroxyphenyppropionate] methane. These may be used alone or in combination of two or more.

As the anti-aging agent, for example, products of Seiko Chemical Co., Ltd., Sumitomo Chemical Co., Ltd., Ouchi Shinko Chemical Industry Co., Ltd., Flexsys Co., Ltd., etc. can be used.

(b-5) Stearic Acid

The rubber composition for inner liner may contain stearic acid. Content of stearic acid is, for example, more than 0.5 parts by mass and less than 10.0 parts by mass with respect to 100 parts by mass of the rubber component. As the stearic acid, conventionally known ones can be used. For example, products of NOF Corporation, NOF Corporation, Kao Corporation, Fuji film Wako Pure Chemical Industries, Ltd., and Chiba Fatty Acid Co., Ltd., etc. can be used.

(b-6) Zinc Oxide

The rubber composition for inner liner may contain zinc oxide. Content of the zinc oxide is, for example, more than 0.5 parts by mass and less than 10 parts by mass with respect to 100 parts by mass of the rubber component. As the zinc oxide, conventionally known ones can be used, for example, products of Mitsui Mining & Smelting Co., Ltd., Toho Zinc Co., Ltd., Hakusui Tech Co., Ltd., Shodo Chemical Industry Co., Ltd., Sakai Chemical Industry Co., Ltd., etc. can be used.

(b-7) Crosslinking Agent and Vulcanization Accelerator

The rubber composition for inner liner preferably contains a cross-linking agent such as sulfur. Content of the cross-linking agent is, for example, more than 0.1 parts by mass and less than 10.0 parts by mass with respect to 100 parts by mass of the rubber component.

As sulfur, those commonly used in the rubber industry, such as powdered sulfur, precipitated sulfur, colloidal sulfur, insoluble sulfur, highly dispersible sulfur, and soluble sulfur, can be used. These may be used alone or in combination of two or more.

As sulfur, for example, products of Tsurumi Chemical Industry Co., Ltd., Karuizawa Sulfur Co., Ltd., Shikoku Chemicals Corporation, Flexsys Co., Ltd., Nippon Kanryu Kogyo Co., Ltd., Hosoi Chemical Industry Co., Ltd., etc. can be used.

Examples of the cross-linking agent other than sulfur include vulcanizing agents containing a sulfur atom such as Tackirol V200 manufactured by Taoka Chemical Industry Co., Ltd., DURALINK HTS (1,6-hexamethylene-sodium dithiosulfate dihydrate) manufactured by Flexsys, and KA9188 (1,6-bis (N, N'-dibenzylthiocarbamoyldithio) hexane) manufactured by Lanxess; and organic peroxides such as dicumyl peroxide.

The rubber composition for inner liner preferably contains a vulcanization accelerator. Content of the vulcanization accelerator is, for example, more than 0.3 parts by mass and less than 10.0 parts by mass with respect to 100 parts by mass of the rubber component.

Examples of the vulcanization accelerator include thiazole-based vulcanization accelerators such as 2-mercaptobenzothiazole, di-2-benzothiazolyl disulfide, and N-cyclohexyl-2-benzothiadylsulfenamide;

thiuram-based vulcanization accelerators such as tetramethylthiuram disulfide (TMTD), tetrabenzyltiuram disulfide (TBzTD), and tetrakis (2-ethylhexyl) thiuram disulfide (TOT-N);

sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, di-ortho-tolylguanidine and ortho-tolylbiguanidine. These may be used alone or in combination of two or more.

(2) Preparation of Tire Inner Member (Inner Liner)

The rubber composition for inner liner is produced by a general method, for example, a manufacturing method including a base kneading step of kneading a rubber component with a filler such as carbon black, and a finish kneading step of kneading the kneaded product obtained in the base kneading step and a cross-linking agent.

Kneading can be performed using a known (sealed) kneader such as a banbury mixer, a kneader, or an open roll.

The kneading temperature of the base kneading step is, for example, higher than 50° C. and lower than 200° C., and the kneading time is, for example, longer than 30 seconds and shorter than 30 minutes. In the base kneading process, in addition to the above components, compounding agents conventionally used in the rubber industry, such as softeners such as oil, stearic acid, zinc oxide, antiaging agents, waxes, and vulcanization accelerators, may be appropriately added and kneaded as needed.

In the finish kneading step, the kneaded product obtained in the base kneading step and the cross-linking agent are kneaded. The kneading temperature of the finish kneading step is, for example, higher than room temperature or and lower than 80° C., and the kneading time is, for example, longer than 1 minute and shorter than 15 minutes. In the finish kneading step, in addition to the above components, a vulcanization accelerator, zinc oxide and the like may be appropriately added and kneaded as needed.

At this time, for example, by adjusting the compounding amount of a filler such as carbon black or silica, or by adjusting the compounding amount of oil, the acetone extraction amount $AE_i$ of the inner liner, E* and tan $\delta_i$ at 70° C. can be adjusted so as to satisfy the above conditions. For example, E* and tan δ can be increased by increasing the amount of filler.

Then, an inner liner is produced by molding the resulting rubber composition for inner liner into a predetermined thickness.

3. Electronic Component Mounting Member

Next, a rubber electronic component mounting member will be described as an example of a specific electronic component mounting member, but as described above, electronic component mounting member is not limited to the member made from rubber.

(1) Rubber Composition Constituting an Electronic Component Mounting Member

The rubber composition constituting the electronic component mounting member (rubber composition for electronic component mounting member) can be formed using the same compounding materials as in the case of the rubber composition for the inner liner. However, a rubber component different from the rubber composition for the inner liner may be used. For example, BR having excellent low-temperature properties and NBR having excellent mechanical properties may be used as main rubber components. In addition, for example, other diene-based rubbers, such as isoprene-based rubber, SBR, SIBR, and CR may be used as appropriate.

When SBR and NR are used as rubber components, content of SBR in 100 parts by mass of the rubber component is, for example, 40 to 60 parts by mass, and content of NR is, for example, 40 to 60 parts by mass.

The SBR, which has not been described in detail as the rubber composition constituting the tire inner member, will be described below. The weight average molecular weight of SBR is, for example, more than 100,000 and less than 2,000,000. The styrene content of SBR is, for example, preferably greater than 5% by mass, more preferably greater than 10% by mass, and further preferably greater than 20% by mass. On the other hand, it is preferably less than 50% by mass, more preferably less than 40% by mass, and further preferably less than 35% by mass. The vinyl bond amount (1,2-bonded butadiene unit content) of SBR is, for example, more than 5% by mass and less than 70% by mass. The structural identification of SBR (measurement of styrene content and vinyl bond amount) can be performed using, for example, equipment of JNM-ECA series equipment manufactured by JEOL Ltd.

The SBR is not particularly limited, and for example, emulsion-polymerized styrene-butadiene rubber (E-SBR), solution-polymerized styrene-butadiene rubber (S-SBR), and the like can be used. SBR may be either unmodified SBR or modified SBR.

The modified SBR may be an SBR having a functional group that interacts with a filler such as silica. Examples thereof include end-modified SBR (end-modified SBR having the above functional group at the terminal) in which at least one end of the SBR is modified with a compound having the above functional group (modifying agent), main chain modified SBR having the functional group in the main chain, main chain terminal modified SBR having the functional group at the main chain and the terminal (for example, a main chain terminal modified SBR having the above functional group to the main chain and having at least one end modified with the above modifying agent, and end-modified SBR which is modified (coupled) with a polyfunctional compound having two or more epoxy groups in the molecule, and into which an epoxy group or hydroxyl group has been introduced.

Examples of the functional group include an amino group, an amide group, a silyl group, an alkoxysilyl group, an isocyanate group, an imino group, an imidazole group, a urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, and an epoxy group. In addition, these functional groups may have a substituent.

As modified SBR, for example, SBR modified with a compound (modifying agent) represented by the following formula can be used.

[Chemical 1]

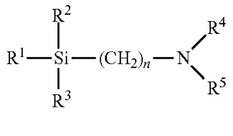

In the formula, $R^1$, $R^2$ and $R^3$ are the same or different and represent alkyl group, alkoxy group, silyloxy group, acetal group, carboxyl group (—COOH), mercapto group (—SH) or derivatives thereof. $R^4$ and $R^5$ are the same or different and represent hydrogen atoms or alkyl group. $R^4$ and $R^5$ may be combined to form a ring structure with nitrogen atoms. n represents an integer.

As the modified SBR modified with the compound (modifying agent) represented by the above formula, SBR in which the polymerization terminal (active terminal) of solution-polymerized styrene-butadiene rubber (S-SBR) is modified with the compound represented by the above formula (such as modified SBR described in JP-A-2010-111753) can be used.

As $R^1$, $R^2$ and $R^3$, an alkoxy group is suitable (preferably an alkoxy group having 1 to 8 carbon atoms, more preferably an alkoxy group having 1 to 4 carbon atoms). As $R^4$ and $R^5$, an alkyl group (preferably an alkyl group having 1 to 3 carbon atoms) is suitable. n is preferably 1 to 5, more preferably 2 to 4, and further preferably 3. Further, when $R^4$ and $R^5$ are combined to form a ring structure together with a nitrogen atom, a 4- to 8-membered ring is preferable. The alkoxy group also includes a cycloalkoxy group (cyclohexyloxy group, and the like) and an aryloxy group (phenoxy group, benzyloxy group, and the like).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. These may be used alone or in combination of two or more.

Further, as the modified SBR, a modified SBR modified with the following compound (modifying agent) can also be used. Examples of the modifying agent include

- polyglycidyl ethers of polyhydric alcohols such as ethylene glycol diglycidyl ether, glycerin triglycidyl ether, trimethylolethanetriglycidyl ether, and trimethylolpropane triglycidyl ether;
- polyglycidyl ethers of aromatic compounds having two or more phenol groups such as diglycidylated bisphenol A;
- polyepoxy compounds such as 1,4-diglycidylbenzene, 1,3,5-triglycidylbenzene, and polyepoxidized liquid polybutadiene;
- epoxy group-containing tertiary amines such as 4,4'-diglycidyl-diphenylmethylamine, and 4,4'-diglycidyl-dibenzylmethylamine;
- diglycidylamino compounds such as diglycidylaniline, N, N'-diglycidyl-4-glycidyloxyaniline, diglycidyl orthotoluidine, tetraglycidylmetaxylenidiamine, tetraglycidylaminodiphenylmethane, tetraglycidyl-p-phenylenediamine, diglycidylaminomethylcyclohexane, and tetraglycidyl-1,3-bisaminomethylcyclohexane;
- amino group-containing acid chlorides such as bis-(1-methylpropyl) carbamate chloride, 4-morpholincarbonyl chloride, 1-pyrrolidincarbonyl chloride, N, N-dimethylcarbamide acid chloride, and N, N-diethylcarbamide acid chloride;
- epoxy group-containing silane compounds such as 1,3-bis-(glycidyloxypropyl)-tetramethyldisiloxane, and (3-glycidyloxypropyl)-pentamethyldisiloxane;
- sulfide group-containing silane compound such as (trimethylsilyl) [3-(trimethoxysilyl) propyl] sulfide, (trimethylsilyl) [3-(triethoxysilyl) propyl] sulfide, (trimethylsilyl) [3-(tripropoxysilyl) propyl] sulfide, (trimethylsilyl) [3-(tributoxysilyl) propyl] sulfide, (trimethylsilyl) [3-(methyldimethoxysilyl) propyl] sulfide, (trimethylsilyl) [3-(methyldiethoxysilyl) propyl] sulfide, (trimethylsilyl) [3-(methyldipropoxysilyl) propyl] sulfide, and (trimethylsilyl) [3-(methyldibutoxysilyl) propyl] sulfide;
- N-substituted aziridine compound such as ethyleneimine and propyleneimine;
- alkoxysilanes such as methyltriethoxysilane, N, N-bis (trimethylsilyl)-3-aminopropyltrimethoxysilane, N, N-bis (trimethylsilyl)-3-aminopropyltriethoxysilane, N, N-bis (trimethylsilyl) aminoethyltrimethoxysilane, and N, N-bis (trimethylsilyl) aminoethyltriethoxysilane;
- (thio) benzophenone compound having an amino group and/or a substituted amino group such as 4-N, N-dimethylaminobenzophenone, 4-N, N-di-t-butylaminobenzophenone, 4-N, N-diphenylamino benzophenone, 4,4'-bis (dimethylamino) benzophenone, 4,4'-bis (diethylamino) benzophenone, 4,4'-bis (diphenylamino) benzophenone, and N, N, N', N'-bis-(tetraethylamino) benzophenone;
- benzaldehyde compounds having an amino group and/or a substituted amino group such as 4-N, N-dimethylaminobenzaldehyde, 4-N, N-diphenylaminobenzaldehyde, and 4-N, N-divinylamino benzaldehyde;
- N-substituted pyroridone such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone;
- N-substituted piperidone such as methyl-2-piperidone, N-vinyl-2-piperidone, and N-phenyl-2-piperidone;
- N-substituted lactams such as N-methyl-ε-caprolactam, N-phenyl-ε-caprolactum, N-methyl-ω-laurilolactum, N-vinyl-ω-laurilolactum, N-methyl-ß-propiolactam, and N-phenyl-ß-propiolactam; and

- N, N-bis-(2,3-epoxypropoxy)-aniline, 4,4-methylene-bis-(N, N-glycidylaniline), tris-(2,3-epoxypropyl)-1,3,5-triazine-2,4,6-triones, N, N-diethylacetamide, N-methylmaleimide, N, N-diethylurea, 1,3-dimethylethylene urea, 1,3-divinylethyleneurea, 1,3-diethyl-2-imidazolidinone, 1-methyl-3-ethyl-2-imidazolidinone, 4-N, N-dimethylaminoacetophenone, 4-N, N-diethylaminoacetophenone, 1,3-bis (diphenylamino)-2-propanone, and 1,7-bis(methylethylamino)-4-heptanone. The modification with the above compound (modifying agent) can be carried out by a known method. These modified BRs may be used alone or in combination of two or more.

As SBR, for example, SBR manufactured and sold by Sumitomo Chemical Co., Ltd., JSR Co., Ltd., Asahi Kasei Co., Ltd., Nippon Zeon Co., Ltd., etc. can be used. SBR may be used independently and may be used in combination of 2 or more types.

(2) Preparation of Rubber Composition for Electronic Component Mounting Member

The rubber composition for an electronic component mounting member can be produced in the same manner as the production of the tire inner member (inner liner) described above. At this time, as in the production of the tire inner member (inner liner), by adjusting the compounding amount of filler such as carbon black and silica and adjusting the compounding amounts of oil and resin components, the acetone extraction amount $AE_r$ and $E^*_r$ at 70° C. can be adjusted to satisfy the above conditions.

(3) Production of Electronic Component Mounting Member

Next, the obtained rubber composition for electronic component mounting members is heated and pressurized into a predetermined shape in a vulcanizer to produce an electronic component mounting member. The vulcanization step can be carried out by applying known vulcanization means. The vulcanization temperature is, for example, higher than 120° C. and lower than 200° C., and the vulcanization time is, for example, longer than 5 minutes and shorter than 15 minutes. Although the housing portion and the joint portion of the electronic component mounting member may be made of different materials, they are preferably integrally formed of the same material.

4. Manufacture of Tires (1) Manufacture of Tires Before Mounting Electronic Component Mounting Members In the present disclosure, the tire before mounting the electronic component mounting member can be manufactured by a normal method. That is, first, an unvulcanized tire is produced by molding the inner liner (tire inner member) produced as described above together with other tire members by a normal method on a tire building machine.

Specifically, the inner liner manufactured as a member for ensuring the airtightness of the tire, the carcass as a member that withstands the load, impact, and filling air pressure that the tire receives, and the bead portion as a member for fixing both ends of the carcass on both side edges and fixing the tire to the rim are arranged on a forming drum, and the carcass portion is folded back to wrap the bead portion. Next, a bead reinforcing layer, a clinch portion, and a sidewall, as a member that protects the bead portion and the carcass and withstands bending, are adhered so as to be outside the bead portion in the tire width direction, and these are formed into a toroid shape. After that, a belt or the like is wound around the central portion of the outer circumference as a member that strongly tightens the carcass and increases the rigidity of the tread, and the tread is further arranged on the outer circumference to produce an unvulcanized tire.

Thereafter, the produced unvulcanized tire is heated and pressurized in a vulcanizer to obtain a tire to which the electronic component mounting member is not mounted. The vulcanization step can be carried out by applying known vulcanization means. The vulcanization temperature is, for example, higher than 120° C. and lower than 200° C., and the vulcanization time is, for example, longer than 5 minutes and shorter than 15 minutes.

(2) Mounting of Electronic Component Mounting Member

Next, using a predetermined adhesive, a separately manufactured electronic component mounting member is mounted to the central portion of the inner member of the manufactured tire in the tire width direction, thereby completing the manufacturing of the tire according to the present embodiment. The electronic component is housed in the electronic component mounting member after production. Further, instead of mounting the electronic component mounting member to the vulcanized tire with an adhesive, the unvulcanized tire and the electronic component mounting member may be vulcanized at the same time. However, since it becomes difficult to replace the electronic component mounting member, it is preferable to mount the electronic component mounting member to the vulcanized tire with an adhesive.

The surface of the tire inner member (tire bore) is generally coated with a release agent to maintain releasability during vulcanization. Preferably, the electronic component mounting member is mounted with an adhesive, after removing the release agent. The following two methods are conceivable for removing the release agent.

The first method is to scrape off the release agent using a polishing machine such as a buffing machine (buffing). By using a polishing machine, large unevenness is eliminated and the surface is roughened to ensure a sufficient contact area for bonding.

The second method is to scrape off the release agent using a laser or the like (laser polishing), which enables polishing with higher precision than a polishing machine and enables making the contact surface with the electronic component mounting member smooth. Therefore, it is considered that the peeling resistance is excellent.

Note that the laser polishing method can be distinguished from other polishing methods by confirming that the step of the tire bore at the interface between the polished portion and the unpolished portion is 200 μm or less. The non-polished portion includes a release agent layer during vulcanization.

As another method, when applying a release agent to the tire bore surface of an unvulcanized tire, the release agent is not applied only to the place where the electronic component mounting member is to be mounted, and after vulcanization, an electronic component mounting member may be mounted on the place.

The adhesive can be appropriately selected and used from commercially available rubber adhesives commonly used for bonding rubber members, such as acrylic rubbers, chloroprene rubbers, styrene-butadiene rubbers, and butyl rubbers. However, it is preferable to use a rubber-based adhesive that can maintain its softness even after curing.

5. Usage

The tire of the present disclosure described above may be a pneumatic tire or a non-pneumatic tire. In addition, it can be applied to various uses such as tires for passenger cars, tires for large vehicles, tires for two-wheeled vehicles, tires for agriculture, tires for mining, and tires for aircraft. It is most preferably applied to pneumatic passenger car tires. The term "passenger car tire" as used herein refers to a tire that is installed on a four-wheeled vehicle and has a maximum load capacity of 1000 kg or less.

The maximum load capacity is not particularly limited as long as it is 1000 kg or less, but in general, as the maximum load capacity increases, the tire weight tends to increase and the impact transmitted to the tire tends to increase. Therefore, it is preferably 900 kg or less, more preferably 800 kg or less, and further preferably 700 kg or less.

The tire weight is preferably 20 Kg or less, more preferably 15 Kg or less, and further preferably 12 Kg or less, 10 Kg or less, or 8 Kg or less, from the viewpoint of softening the impact transmitted to the tire. The term "tire weight" as used herein includes the weight of the electronic component and the electronic component mounting member. When sealant, sponge, etc. are provided in the tire bore, the tire weight also includes the weights of them.

EXAMPLES

In the following examples, a tire (size: 195/65R15) having the configuration shown in FIG. 1 was manufactured, and the crack resistance of the tire inner member (inner liner) of the electronic component mounting member was evaluated.

1. Manufacture of Inner Liners (1) Manufacture of Rubber Composition for Inner Liner First, a rubber composition for inner liner was produced.

(a) Compounding Material

First, each compounding material shown below was prepared.

(a-1) Rubber Component (a-1-1) NR: RSS #3

(a-1-2) IIR-1: Bromobutyl 2255 (brominated butyl rubber) manufactured by Exxon Chemical Co., Ltd.

(a-1-3) IIR-2: Recycled butyl-based rubber manufactured by Carquest Co., Ltd. (Butyl rubber: 50% by mass)

(a-2) Compounding Materials Other than Rubber Components (a-2-1) Carbon black: Show Black $N_{660}$ manufactured by Cabot Japan Co., Ltd.

(a-2-2) Calcium carbonate: Tankal 200 manufactured by Takehara Chemical Industry Co., Ltd.

(a-2-3) Oil: Diana Process PA32 manufactured by Idemitsu Kosan Co., Ltd.

(Paraffinic Process Oil)

(a-2-4) compatibilizer: PROMIX400 manufactured by Flow Polymers Inc.

(Mixed Resin of Aliphatic Resin and Aromatic Resin)

(a-2-5) Anti-aging agent: Antage RD manufactured by Kawaguchi Chemical Industry Co., Ltd. (2,2,4-trimethyl-1,2-dihydroquinoline)

(a-2-6) Stearic acid: TSUBAKI manufactured by NOF Corporation (a-2-7) Zinc oxide: Two types of zinc oxide manufactured by Mitsui Mining & Smelting Co., Ltd.

(a-2-8) Sulfur: HK-200-5 (containing 5% by mass of oil) manufactured by Hosoi Chemical Co., Ltd.

(a-2-9) Vulcanization accelerator: Nocceler DM manufactured by Ouchi Shinko Chemical Industry Co., Ltd. (di-2-benzothiazolyl disulfide)

(b) Manufacture of Rubber Composition for Inner Liner

Using a banbury mixer, materials other than zinc oxide, sulfur and a vulcanization accelerator were kneaded at 150° C. for 5 minutes according to the formulation contents shown in Table 1 to obtain a kneaded product. Each compounding quantity is part by mass. For convenience, Table 1 also shows $AE_i$, $E^*_i$, and tan $\delta_i$ measured later.

Next, zinc oxide, sulfur and a vulcanization accelerator were added to the resulting kneaded material and kneaded at 80° C. for 5 minutes using an open roll to obtain a rubber composition for an inner liner.

TABLE 1

| | Formulation No. | | | | | |
|---|---|---|---|---|---|---|
| | 1 | 2 | 3 | 4 | 5 | 6 |
| NR | 10 | 10 | 10 | 10 | 10 | 10 |
| IIR-1 | 80 | 80 | 80 | 80 | 80 | 80 |
| IIR-2 | 20 | 20 | 20 | 20 | 20 | 20 |
| Carbon black | 55 | 55 | 55 | 45 | 25 | 45 |
| Calcium carbonate | 13 | 13 | 23 | 18 | 18 | 18 |
| Oil | 5.5 | 8.5 | 10.5 | 3.5 | 1 | 10.5 |
| Compatibilizer | 10 | 10 | 10 | 5 | 7.5 | 10 |
| Anti-aging agent | 1 | 1 | 1 | 1 | 1 | 1 |
| Stearic acid | 1.5 | 1.5 | 2 | 1.5 | 1.5 | 1.5 |
| Zinc oxide | 1.8 | 1.8 | 2.2 | 2.2 | 2 | 1.3 |
| Sulfur | 0.8 | 0.8 | 0.9 | 0.5 | 0.7 | 0.5 |
| Vulcanization accelerator | 1.3 | 1.3 | 1.3 | 1.35 | 1.35 | 1.1 |
| $AE_i$ (% by mass) | 10.6 | 11.9 | 12.2 | 7.5 | 8.5 | 13.0 |
| $E^*_i$ (MPa) | 3.9 | 3.6 | 3.8 | 3.5 | 2.8 | 3.0 |
| tan $\delta_i$ | 0.19 | 0.19 | 0.18 | 0.17 | 0.14 | 0.19 |

(2) Manufacture of Inner Liner

Next, an inner liner was manufactured by molding into a predetermined shape using the obtained rubber composition for inner liner.

2. Manufacture of Electronic Component Mounting Members

Separately, an electronic component mounting member was manufactured.

(1) Manufacture of Rubber Composition for Electronic Component Mounting Member (a) Compounding Material First, each compounding material shown below was prepared.

(a-1) Rubber Component (a-1-1) NR: RSS/43

(a-1-2) SBR: JSR1502 manufactured by JSR Corporation (a-2) Compounding Materials Other than Rubber Components (a-2-1) Carbon black: Show Black N220 manufactured by Cabot Japan Co., Ltd.

(a-2-2) Silica: Zeosil 1115MP manufactured by Rhodia Co., Ltd.

(a-2-3) Silane coupling agent: Si266 manufactured by Degussa Co., Ltd.

(Bis (3-triethoxysilylpropyl) disulfide)

(a-2-4) Calcium carbonate: Tankal 200 manufactured by Takehara Chemical Industry Co., Ltd.

(a-2-5) Oil: Process X-260 manufactured by Japan Energy Co., Ltd.

(a-2-6) Antiaging agent-1: Nocrac 6C manufactured by Ouchi Shinko Chemical Industry Co., Ltd. (N-phenyl-N'(1,3-dimethylbutyl)-p-phenylenediamine)

(a-2-7) Anti-aging agent-2: Antage RD manufactured by Kawaguchi Chemical Industry Co., Ltd. (2,2,4-trimethyl-1,2-dihydroquinoline)

(a-2-8) Stearic acid: TSUBAKI manufactured by NOF Corporation (a-2-9) Zinc oxide: Two types of zinc oxide manufactured by Mitsui Mining & Smelting Co., Ltd.

(a-2-10) Sulfur: HK-200-5 (containing 5% by mass of oil) manufactured by Hosoi Chemical Co., Ltd.

(a-2-11) Vulcanization accelerator-1: Nocceler CZ-G (CZ) manufactured by Ouchi Shinko Chemical Industry Co., Ltd. (N-cyclohexyl-2-benzothiazolylsulfenamide)

(a-2-12) Vulcanization accelerator-2: Nocceler D (DPG) manufactured by Ouchi Shinko Chemical Industry Co., Ltd. (1,3-diphenylguanidine)

(b) Manufacture of Rubber Composition for Electronic Component Mounting Member

Using a banbury mixer, ingredients other than zinc oxide, sulfur and a vulcanization accelerator were kneaded at 150° C. for 5 minutes according to the contents of each formulation shown in Table 2 to obtain a kneaded product. Each compounding quantity is part by mass. For convenience, Table 2 also shows $AE_r$ and $E^*_r$ measured later.

Next, zinc oxide, sulfur and a vulcanization accelerator were added to the resulting kneaded product, and kneaded for 5 minutes at 80° C. using an open roll to obtain a rubber composition for electronic component mounting members.

TABLE 2

| | Formulation No. | | | | | |
|---|---|---|---|---|---|---|
| | 7 | 8 | 9 | 10 | 11 | 12 |
| NR | 45 | 45 | 45 | 45 | 45 | 45 |
| SBR | 55 | 55 | 55 | 55 | 55 | 55 |
| Carbon black | 3 | 3 | 3 | 3 | 5 | 3 |
| Silica | 60 | 60 | 55 | 45 | 65 | 50 |
| Calcium carbonate | 30 | 30 | 30 | 30 | 25 | 30 |

TABLE 2-continued

| | Formulation No. | | | | | |
|---|---|---|---|---|---|---|
| | 7 | 8 | 9 | 10 | 11 | 12 |
| Oil | 9 | 14 | 3 | 3 | 17 | 7 |
| Antiaging agent-1 | 1 | 1 | 1 | 1 | 1 | 1 |
| Anti-aging agent-2 | 1 | 1 | 1 | 1 | 1 | 1 |
| Stearic acid | 1.2 | 1.2 | 1.5 | 2 | 1.5 | 2 |
| Zinc oxide | 2 | 2 | 2 | 2 | 2 | 2 |
| Sulfur | 1.2 | 1.2 | 1.2 | 1 | 2 | 1 |
| Silane coupling agent | 5 | 5 | 4.2 | 4 | 5.5 | 4.5 |
| Vulcanization accelerator -1 | 1.8 | 1.8 | 1.8 | 1.3 | 2 | 1.3 |
| Vulcanization accelerator -2 | 1 | 1 | 1 | 1.2 | 1.2 | 1 |
| $AE_r$ (% by mass) | 9.2 | 11.3 | 6.9 | 7.2 | 12.5 | 8.9 |
| $E^*_r$ (MPa) | 9.8 | 9.1 | 10.0 | 8.1 | 11.2 | 8.1 |

(2) Manufacture of Electronic Component Mounting Members

Next, the obtained rubber composition for an electronic component mounting member was vulcanized and molded to a shape as shown in FIG. 3, that is, a shape having the storage space S with a circular cross section, and having size of the diameter (outer diameter) D of the joint surface A of 40 mm, the thickness (height) H of 25 mm, the thickness T of the joint portion of 1 mm, and the width W of the flange of 10 mm, to produce an electronic component mounting member.

3. Manufacture of Test Tires (1) Manufacture of Tires Before Mounting Electronic Component Mounting Members First, the tire was manufactured before the electronic component mounting member was mounted.

Specifically, the inner liners having the formulations shown in Tables 3 and 4 were pasted together with other tire members to form an unvulcanized tire, which was then press vulcanized for 10 minutes at 170° C. to obtain a tire before mounting the electronic component mounting member.

(2) Manufacture of Test Tires

Next, on the tire bore surface before mounting each electronic component mounting member, the locations for mounting electronic component mounting member shown in Tables 3 and 4 were polished by the polishing method shown in Tables 3 and 4 to remove release agent. Thereafter, the electronic component mounting member manufactured with the composition shown in Tables 3 and 4 and storing the predetermined electronic component in its storage space is mounted using an adhesive, so to have each adhesion area shown in Tables 3 and 4, to manufacture test tires of Examples 1 to 6 (Table 3) and Comparative Examples 1 to 6 (Table 4). The width m of deviation of the center of the electronic component mounting member from the center line CL was set to 2 mm. As the adhesive, a commercially available chloroprene rubber adhesive was used.

In the laser polishing, a laser beam adjusted to a movement pitch of 60 μm and a movement speed of 4000 mm/s is used to reciprocate the mounting location of the electronic component mounting member several times to scrape off the release agent and rubber surface, resulting in a step of 95 μm.

4. Calculation of Parameters

After that, from each test tire, a rubber test piece for viscoelasticity measurement of 20 mm in length, 4 mm in width and 1 mm in thickness was cut off from the inner liner layer inside the tread portion so that the tire circumferential direction was the long side. For each rubber test piece, using Eplexor series manufactured by GABO, under the conditions of measured temperature: 70° C., initial strain: 10%, dynamic strain: ±1%, and frequency: 10 Hz, complex elastic modulus $E^*_i$ (MPa) was measured under the deformation mode: elongation; and loss tangent (70° C. tan $\delta_i$) was measured under the deformation mode tensile.

In addition, the complex elastic modulus $E^*_r$ (MPa) of the electronic component mounting member was measured in the same manner as above by cutting off a test piece for viscoelasticity measurement of 20 mm in length, 4 mm in width and 1 mm in thickness from the joint portion. The results are shown in Tables 1 and 2, as well as Tables 3 and 4.

Next, $AE_r/AE_i$, $0.5E^*_i$ and $3.0E^*_i$ for each test tire were calculated based on the above measurement results. The results are shown in Tables 3 and 4.

5. Evaluation Test

Evaluation was performed on the crack resistance, that is, the degree of cracks generated in the tire after running for a predetermined distance.

(1) Test Method

Each test tire is installed on all wheels of a vehicle (domestic FF vehicle, displacement 2000 cc), and after filling air so that the internal pressure is 230 kPa, it was run on a dry road test course at a speed of 80 km/h. After running 1000 km, the tire was removed from the rim, and the number of cracks generated in the tire inner member surface and the length of each crack were measured.

Evaluation was performed based on the total length of the number of cracks with a length of 1 mm or more. Specifically, as shown in the following formula, the reciprocal of the ratio of the total length of cracks obtained in each test tire to the total length of cracks obtained in Comparative Example 1 is indexed, and evaluated relatively. A larger value indicates less occurrence of cracks.

$$\text{Crack resistance} = (\text{total length of Comparative Example 1}/\text{total length of each test tire})\times 100$$

(2) Evaluation Results

Evaluation results are shown in Tables 3 and 4.

TABLE 3

| | EXAMPLE | | | | | |
|---|---|---|---|---|---|---|
| | 1 | 2 | 3 | 4 | 5 | 6 |
| Contains inner liner | Formulation number | | | | | |
| | 2 | 2 | 3 | 4 | 5 | 5 |
| Rubber mount combination | Formulation number | | | | | |
| | 11 | 11 | 11 | 8 | 12 | 12 |
| Polishing method | Buff polishing | Buff polishing | Buff polishing | Buff polishing | Buff polishing | Laser polishing |

TABLE 3-continued

| | EXAMPLE | | | | | |
|---|---|---|---|---|---|---|
| | 1 | 2 | 3 | 4 | 5 | 6 |
| $AE_i$ (% by mass) | 11.9 | 11.9 | 12.2 | 7.5 | 8.5 | 8.5 |
| $AE_r$ (% by mass) | 12.5 | 12.5 | 12.5 | 11.3 | 8.9 | 8.9 |
| $AE_r/AE_i$ | 1.05 | 1.05 | 1.02 | 1.51 | 1.05 | 1.05 |
| Adhesion area ($cm^2$) | 78.26 | 28.26 | 28.26 | 28.26 | 28.26 | 28.26 |
| $E^*_i$ (Mpa) | 3.6 | 3.6 | 3.8 | 3.5 | 2.8 | 2.8 |
| $0.5E^*_i$ (Mpa) | 1.8 | 1.8 | 1.9 | 1.75 | 1.4 | 1.4 |
| $3.0E^*_i$ (Mpa) | 10.8 | 10.8 | 11.4 | 10.5 | 8.4 | 8.4 |
| $E^*_r$ (Mpa) | 11.2 | 11.2 | 11.2 | 9.1 | 8.1 | 8.1 |
| 70° C. tan $\delta_i$ | 0.19 | 0.19 | 0.18 | 0.17 | 0.14 | 0.14 |
| Crack resistance | 110 | 107 | 105 | 115 | 120 | 125 |

TABLE 4

| | COMPARATIVE EXAMPLE | | | | | |
|---|---|---|---|---|---|---|
| | 1 | 2 | 3 | 4 | 5 | 6 |
| Contains inner liner | Formulation number | | | | | |
| | 6 | 2 | 2 | 1 | 4 | 5 |
| Rubber mount combination | Formulation number | | | | | |
| | 8 | 9 | 9 | 7 | 9 | 10 |
| Polishing method | Buff polishing | Buff polishing | Buff polishing | Buff polishing | Buff polishing | Buff polishing |
| $AE_i$ (% by mass) | 13.0 | 11.9 | 11.9 | 10.6 | 7.5 | 8.5 |
| $AE_r$ (% by mass) | 11.3 | 6.9 | 6.9 | 9.2 | 6.9 | 7.2 |
| $AE_r/AE_i$ | 0.87 | 0.58 | 0.58 | 0.87 | 0.92 | 0.85 |
| Adhesion area ($cm^2$) | 78.5 | 78.5 | 28.26 | 28.26 | 28.26 | 28.26 |
| $E^*_i$ (Mpa) | 3.0 | 3.6 | 3.6 | 3.9 | 3.5 | 2.8 |
| $0.5E^*_i$ (Mpa) | 1.5 | 1.8 | 1.8 | 1.95 | 1.75 | 14 |
| $3.0E^*_i$ (Mpa) | 9.0 | 10.8 | 10.8 | 11.7 | 10.5 | 84 |
| $E^*_r$ (Mpa) | 9.1 | 10.0 | 10.0 | 9.8 | 10.0 | 8.1 |
| 70° C. tan $\delta_i$ | 0.19 | 0.19 | 0.19 | 0.19 | 0.17 | 0.14 |
| Crack resistance | 100 | 99 | 98 | 96 | 94 | 91 |

A comparison of Tables 3 and 4 shows that when $AE_r/AE_i>1$ (Examples 1 to 6), tires with excellent crack resistance can be provided.

A comparison of Examples in Table 3 shows that crack resistance is superior when $AE_r/AE_i$ is 1.05 or more (Examples 1, 2, 4 to 6). It can be seen that, among these, the cases (Examples 4 to 6), where $AE_r$ is 12% by mass or less, $E^*_i$ and $E^*_r$ satisfy $0.5E^*_i \leq E^*_r \leq 3.0E^*_i$, and 70° C. tan $\delta_i$ is 0.18 or less, are further excellent, and the cases (Examples 5 and 6), where 70° C. tan $\delta_i$ is 0.15 or less, are particularly excellent.

Although the present disclosure has been described above based on the embodiments, the present disclosure is not limited to the above embodiments. Various modifications can be made to the above embodiment within the same and equivalent range as the present disclosure.

The present disclosure (1) is;

a tire in which an electronic component mounting member for incorporating an electronic component is mounted on the surface of the tire inner member, wherein the electronic component mounting member has an electronic component storage portion that stores the electronic component, and a joint portion that has a joint surface for mounting the electronic component mounting member to the surface of the tire inner member, and the acetone extraction amount $AE_r$ (% by mass) of the electronic component mounting member and the acetone extraction amount $AE_i$ (% by mass) of the tire inner member satisfy the following (formula 1).

$$AE_r / AE_i > 1 \quad \text{(formula 1)}$$

The present disclosure (2) is;

the pneumatic tire according to the present disclosure (1), wherein the electronic component mounting member has an acetone extraction amount $AE_r$ of less than 12% by mass.

The present disclosure (3) is;

the pneumatic tire according to the present disclosure (1) or (2), wherein the adhesion area between the joint portion of the electronic component mounting member and the tire inner member is 12 $cm^2$ or more.

The present disclosure (4) is;

the pneumatic tire according to the present disclosure (3), wherein the adhesion area between the joint portion of the electronic component mounting member and the tire inner member is less than 75 $cm^2$.

The present disclosure (5) is the pneumatic tire of any combination of the present disclosures (1) to (4), wherein the complex elastic modulus $E^*_r$ (MPa) of the joint portion at 70° C. and the complex elastic modulus $E^*_i$ (MPa) of the tire inner member at 70° C. satisfy the following (formula 2).

$$0.5E_i^* \leqq E_r^* \leqq 3.0E_i^* \quad \text{(formula 2)}$$

The present disclosure (6) is the pneumatic tire of any combination of the present disclosures (1) to (5), wherein the loss tangent (70° C. tan $\delta_i$) of the tire inner member at 70° C. is 0.18 or less.

The present disclosure (7) is the pneumatic tire according to the present disclosure (6), wherein the loss tangent (70° C. tan $\delta_i$) of the tire inner member is 0.15 or less.

The present disclosure (8) is the pneumatic tire of any combination of the present disclosures (1) to (7), wherein the tire inner member is an inner liner formed of a rubber composition containing 70 parts by mass or more of butyl-based rubber in 100 parts by mass of the rubber component.

The present disclosure (9) is the pneumatic tire according to the present disclosure (8), wherein the butyl-based rubber contains 30 parts by mass or less of recycled butyl rubber.

The present disclosure (10 is the pneumatic tire of any combination of the present disclosures (1) to (9), wherein a side facing the joint surface is open in the electronic component storage portion of the electronic component mounting member.

The present disclosure (11) is the pneumatic tire of any combination of the present disclosures (1) to (10), wherein the electronic component mounting member is mounted on the surface of the tire inner member using an adhesive.

The present disclosure (12) is the pneumatic tire of any combination of the present disclosures (1) to (11), wherein, in the tire cross-section, the center of said electronic component mounting member is located in the central two areas closest to the tire equatorial plane among the four areas divided by the lines extending parallel to the tire radial direction from the line that divides between the two ground contact edges forming the tread contact width into four equal parts.

The present disclosure (13) is the pneumatic tire of any combination of the present disclosures (1) to (12), which is a tire for passenger vehicles.

DESCRIPTION OF REFERENCE SIGNS

1. Tire
2. Electronic component mounting member
3. Surface of tread
11. Tread
12. Belt
13. Sidewall
14. Carcass layer
15. Bead core
16. Bead Apex
17. Chafer
18. Clinch
19. Tire inner member (inner liner)
21. Electronic component storage portion
22. Joint portion
31. Circumferential groove
32*a*, 32*d*. Lateral groove
33. Sipes
34. Region closest to equatorial plane
35. Tire axially outer region
dt. Tread thickness
dr. Thickness of electronic component mounting member
A. Joint surface
CL. Tire center line
cl. Center line of electronic component mounting member
D. Joint surface diameter (outer diameter)
$E_1$. Upper end (on the side facing the joint surface of the electronic component storage portion)
$E_2$. Lower end (on the joint surface side of the electronic component storage portion)
H. Thickness (height) of electronic component mounting member
I. Tire bore surface
m. Deviation width of the center of the electronic component mounting member
S. Storage space
T. Thickness of joint portion
VL. Virtual line
W. Flange width

What is claimed is:

1. A tire comprising an electronic component and an electronic component mounting member for incorporating the electronic component is mounted on the surface of a tire inner member;

wherein the electronic component mounting member has an electronic component storage portion that stores the electronic component, and a joint portion that has a joint surface for mounting the electronic component mounting member to the surface of the tire inner member;

the acetone extraction amount $AE_r$ (% by mass) of the electronic component mounting member and the acetone extraction amount $AE_i$ (% by mass) of the tire inner member satisfy the following (formula 1):

$$AE_r / AE_i > 1; \quad \text{(formula 1)}$$

wherein the acetone extraction amount $AE_r$ of the electronic component mounting member is 8.9% by mass or more and 12% by mass or less;

the tire center line CL and the center of the electronic component mounting member are deviated, and the deviation width is 1 to 50 mm in the tire axial direction; and the electronic component is incorporated in the electronic storage portion.

2. The pneumatic tire according to claim 1, wherein the acetone extraction amount $AE_r$ of the electronic component mounting member is 8.9% by mass or more and 11.5% by mass or less.

3. The pneumatic tire according to claim 1, wherein the adhesion area between the joint portion of the electronic component mounting member and the tire inner member is 12 $cm^2$ or more.

4. The pneumatic tire according to claim 3, wherein the adhesion area between the joint portion of the electronic component mounting member and the tire inner member is less than 75 $cm^2$.

5. The pneumatic tire according to claim 1, wherein the complex elastic modulus Er (MPa) of the joint portion at 70° C. and the complex elastic modulus $E^*_i$(MPa) of the tire inner member at 70° C. satisfy the following (formula 2):

$$0.5E_i^* \leqq E_r^* \leqq 3.0E_i^*. \quad \text{(formula 2)}$$

6. The pneumatic tire according to claim 1, wherein the loss tangent (70° C. tan di) of the tire inner member at 70° C. is 0.18 or less.

7. The pneumatic tire according to claim 6, wherein the loss tangent (70° C. tan $\delta_i$) of the tire inner member is 0.15 or less.

8. The pneumatic tire according to claim 6, wherein a side facing the joint surface is open in the electronic component storage portion of the electronic component mounting member.

9. The pneumatic tire according to claim 1, wherein the electronic component mounting member is mounted on the surface of the tire inner member using an adhesive.

10. The pneumatic tire according to claim 1, wherein, in the tire cross-section, the center of said electronic component mounting member is located in the central two areas closest to the tire equatorial plane among the four areas divided by the lines extending parallel to the tire radial direction from the line that divides between the two ground contact edges forming the tread contact width into four equal parts.

11. The pneumatic tire according to claim 1, which is a tire for passenger vehicles.

12. The pneumatic tire according to claim 1, wherein a side facing the joint surface is open in the electronic component storage portion of the electronic component mounting member.

13. A tire comprising an electronic component and an electronic component mounting member for incorporating the electronic component is mounted on the surface of the tire inner member; wherein the electronic component mounting member has an electronic component storage portion that stores the electronic component, and a joint portion that has a joint surface for mounting the electronic component mounting member to the surface of the tire inner member;

the acetone extraction amount $AE_r$ (% by mass) of the electronic component mounting member and the acetone extraction amount $AE_i$ (% by mass) of the tire inner member satisfy the following (formula 1):

$$AE_r / AE_i > 1.05; \quad \text{(formula 1)}$$

wherein the acetone extraction amount $AE_r$ of the electronic component mounting member is 8.9% by mass or more and 12% by mass or less; and the electronic component is incorporated in the electronic storage portion.

14. A tire comprising an electronic component and an electronic component mounting member for incorporating the electronic component is mounted on the surface of the tire inner member; wherein the electronic component mounting member has an electronic component storage portion that stores the electronic component, and a joint portion that has a joint surface for mounting the electronic component mounting member to the surface of the tire inner member;

the acetone extraction amount $AE_r$ (% by mass) of the electronic component mounting member and the acetone extraction amount $AE_i$ (% by mass) of the tire inner member satisfy the following (formula 1):

$$AE_r / AE_i > 1.05; \quad \text{(formula 1)}$$

wherein the acetone extraction amount $AE_r$ of the electronic component mounting member is 8.9% by mass or more and 12% by mass or less;

the tire center line CL and the center of the electronic component mounting member are deviated, and the deviation width is 1 to 50 mm in the tire axial direction;

the tire inner member is an inner liner formed of a rubber composition containing 70 parts by mass or more of butyl-based rubber in 100 parts by mass of the rubber component, and the butyl-based rubber contains 5 parts by mass or more and 30 parts by mass or less of recycled butyl rubber; and the electronic component is incorporated in the electronic storage portion.

* * * * *